(12) United States Patent
Cowburn et al.

(10) Patent No.: US 10,810,782 B1
(45) Date of Patent: Oct. 20, 2020

(54) SEMANTIC TEXTURE MAPPING SYSTEM

(71) Applicant: Snap Inc., Santa Monica, CA (US)

(72) Inventors: Piers Cowburn, London (GB); David Li, London (GB); Isac Andreas Müller Sandvik, London (GB); Qi Pan, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/372,215

(22) Filed: Apr. 1, 2019

(51) Int. Cl.
G06T 15/04 (2011.01)
G06T 17/20 (2006.01)
G06K 9/72 (2006.01)
G06T 7/11 (2017.01)
G06K 9/62 (2006.01)

(52) U.S. Cl.
CPC ............ G06T 15/04 (2013.01); G06K 9/6257 (2013.01); G06K 9/726 (2013.01); G06T 7/11 (2017.01); G06T 17/20 (2013.01)

(58) Field of Classification Search
CPC . G06N 3/02; G06N 3/08; G06N 20/00; G06T 7/11; G06T 7/40; G06T 11/40; G06T 15/04; G06T 2207/20081; G06T 2207/20084; G06T 2207/20112
See application file for complete search history.

(56) References Cited

U.S. PATENT DOCUMENTS

| 2011/0170768 | A1* | 7/2011 | Alldrin | G06K 9/4661 382/159 |
| 2015/0077427 | A1* | 3/2015 | Dumitras | G06T 7/40 345/582 |
| 2016/0350930 | A1* | 12/2016 | Lin | G06K 9/66 |
| 2017/0278289 | A1* | 9/2017 | Marino | G06K 9/00765 |
| 2019/0377981 | A1* | 12/2019 | Veeravasarapu | G06K 9/6253 |

OTHER PUBLICATIONS

Tulsiani, Shubham. Learning Single-view 3D Reconstruction of Objects and Scenes. University of California, Berkeley, 2018, p. 47-63 (Year: 2018).*

* cited by examiner

Primary Examiner — Diane M Wills
(74) Attorney, Agent, or Firm — Schwegman Lundberg & Woessner, P.A.

(57) ABSTRACT

A semantic texture map system to generate a semantic texture map based on a 3D model that comprises a plurality of vertices that include coordinate that indicate positions of the plurality of vertices, a UV map, and a semantic segmentation image that comprises a set of semantic labels.

18 Claims, 10 Drawing Sheets

500

ASSIGNING A MATERIAL PARAMETER TO A CLASS THAT CORRESPONDS
WITH A SEMANTIC LABEL FROM AMONG THE SET OF SEMANTIC LABELS
502

IDENTIFYING A TEXEL THAT INCLUDES THE SEMANTIC LABEL
504

CAUSING DISPLAY OF AR CONTENT BASED ON THE MATERIAL
PARAMETER OF THE TEXEL
506

FIG. 5

ASSIGNING THE SEMANTIC TEXTURE MAP TO A SET OF GEOLOCATION COORDINATE THAT IDENTIFY A LOCATION
602

DETECTING A CLIENT DEVICE AT THE LOCATION IDENTIFIED BY THE GEOLOCATION COORDINATES
604

APPLYING THE SEMANTIC TEXTURE MAP TO A PRESENTATION OF AN IMAGE AT THE CLIENT DEVICE
606

SEMANTIC TEXTURE MAPPING SYSTEM

TECHNICAL FIELD

Embodiments of the present disclosure relate generally to texture mapping, and more particularly, to systems for generating semantic texture maps.

BACKGROUND

A "texture map" is a two-dimensional (2D) image file that can be applied to the surface of a three-dimensional (3D) model to add color, texture, or other surface details. Texture maps are typically developed to directly correspond with the "UV" coordinates of a 3D model and may be based on photographs or other images. The letters "U" and "V" denote the axes of a 2D texture (because "X," "Y," and "Z" are already used to denote the axes of 3D objects).

For example, when a 3D model, such as a polygon mesh, is created, a UV map that includes a set of UV coordinates can be generated based on the positions of the vertices of the mesh. The UV map therefore comprises a projection of a 2D image upon a surface of the 3D model.

Although traditional computational texture analysis provides adequate means for producing texture maps to be used in various applications, there remains a disparity between "visual" and "semantic" features of a space. This means they are unsuitable for applications intended for high levels of user interaction.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a flowchart illustrating a method for presenting content based on a semantic feature based on a texture map that include semantic labels, according to certain example embodiments.

DETAILED DESCRIPTION

Figure 1:
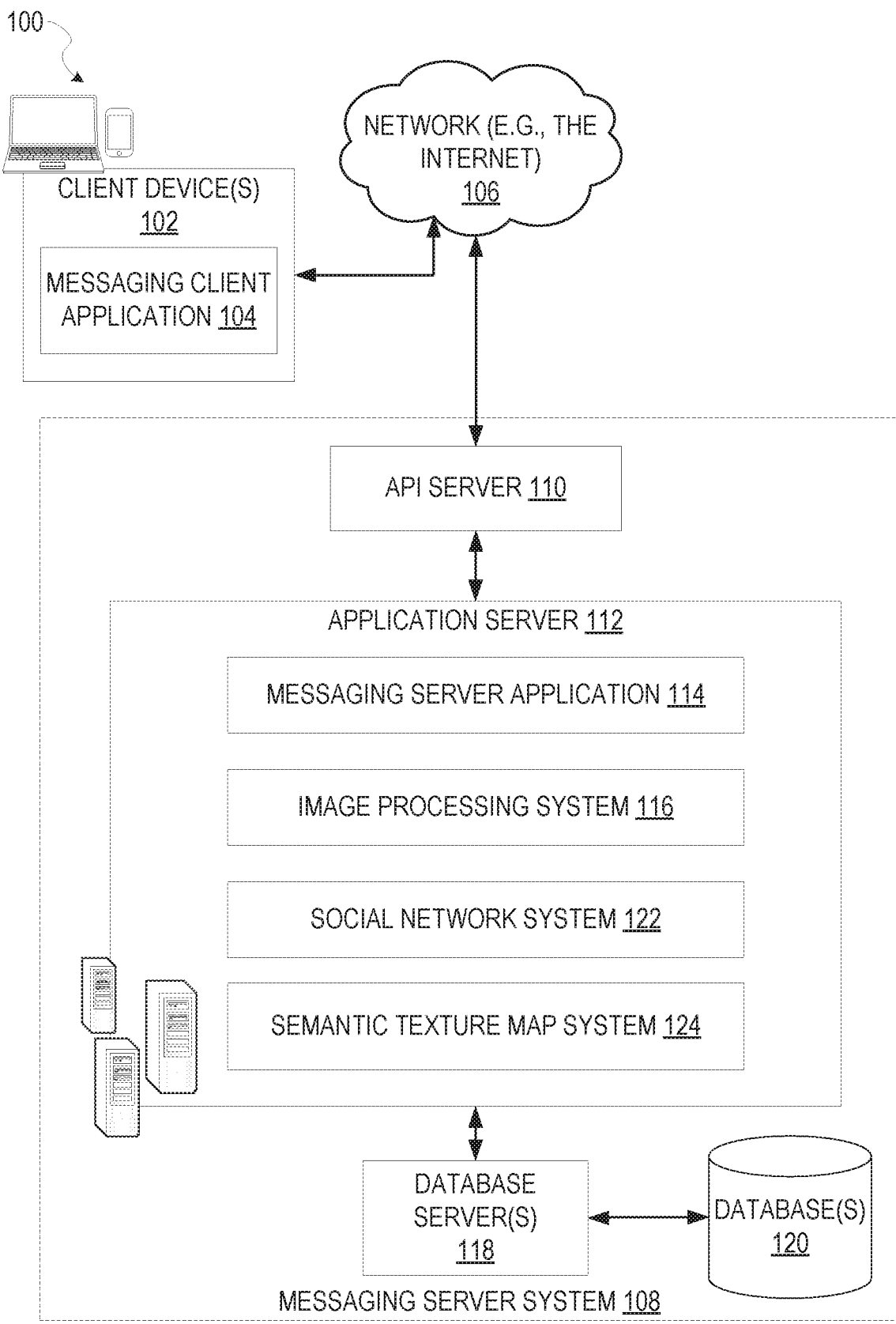
FIG. 1 is a block diagram showing an example messaging system for exchanging data (e.g., messages and associated content) over a network in accordance with some embodiments, wherein the messaging system includes a semantic texture map system.

As discussed above, texture mapping is a method for defining details, surface textures, or color information of a 3D model. While existing texture mapping systems are adequate for adding visual details to 3D models, they fail to provide a means for assigning properties and labels to various surfaces of the 3D models, thereby making them less than ideal for applications where high levels of user interaction is to be expected. Example embodiments described herein therefore relate to systems and methods for generating a "semantic" texture map of a 3D object, where the semantic texture map defines a set of semantic segmentation labels of a particular 3D object.

Example embodiments described herein relate to a semantic texture map system to perform operations that include: accessing an image that comprises a set of image features; retrieving a semantic segmentation image based on the set of image features of the image, the semantic segmentation image comprising a set of semantic labels; generating a 3D model, such as a 3D mesh model, based on the set of image features of the image, the 3D model comprising a plurality of vertices that include coordinate that indicate positions of the plurality of vertices; generating a UV map based on the set of image features and the coordinates of the plurality of vertices of the 3D model, the UV map comprising a set of two-dimensional (2D) texture coordinates based on the coordinates of the plurality of vertices of the 3D mesh model; projecting the semantic segmentation image onto the 3D mesh model based on the 2D texture coordinates of the UV map; mapping the set of semantic labels of the semantic segmentation image to the 2D texture coordinates of the UV map; and generating a semantic texture map that comprises a set of texels, wherein the texels each include one or more semantic labels and a set of 2D texture coordinates.

"Semantic segmentation" describes computer vision techniques to predict class labels for each pixel of an image. A semantic segmentation image therefore comprises an image that includes a set of class labels that identify elements or objects depicted by the pixels of the image. According to certain embodiments, a semantic segmentation image can be generated by the semantic texture map system through a semantic segmentation neural network.

For example, the semantic texture map system may receive, as inputs from a plurality of distributed client devices, image data that includes metadata identifying a location or object. The image data may be classified and sorted by the semantic texture map system based on the corresponding image metadata. The semantic texture map system may maintain a database that comprises collections of image data sorted based on a location or object depicted by the image data. The semantic segmentation neural network may then be trained to generate semantic segmentation images that comprise semantic class labels that identify semantic features of pixels in an image, based on the collections of images from the database.

Semantic features may for example include: contextual features that correspond with a physical object, location, or surface; analogical features that reference some other known category or class; visual features that define visual or graphical properties of a surface or object; as well as material parameters that define properties of a surface or object and which may include a "roughness value," a "metallic value," a "specular value," and a "base color value."

Accordingly, responsive to receiving or accessing an image that comprises image metadata, and a set of image features, the semantic texture map system generates or retrieves a semantic segmentation image based on the image (the image features of the image or the image metadata of the image), where in the semantic segmentation image comprises a set of semantic feature labels assigned to the to pixels of the image.

The semantic texture map system generates a 3D model based on the image accessed by the semantic texture map system. For example, the semantic texture map system may identify a location or object depicted in the image based on the image metadata or the image features and retrieves a collection of image depicted the location or object from a database. The semantic texture map system processes the collection of images through a 3D reconstruction pipeline to obtain a dense 3D mesh (i.e., a 3D model) based on the collection of images that correspond with the location or objected depicted in the image accessed, where the dense 3D mesh comprises a plurality of vertices, where each vertex among the plurality of vertices includes corresponding coordinates. Similarly, the semantic texture map system generates a UV map based on the image and the collection of images, wherein the UV map comprises a set of 2D texture coordinates to project a 2D image upon the 3D mesh. For example, the 3D mesh may be "wrapped" with a 2D image based on the 2D texture coordinates of the UV map.

The semantic texture map system projects the semantic segmentation image that corresponds with the image upon the 3D model based on the coordinates of the vertices and maps the semantic feature labels of semantic segmentation image to the 2D texture coordinates of the UV map. The resulting semantic texture map therefor comprises a set of texels, where each texel comprises one or more semantic feature labels, and 2D texture coordinates based on the UV map.

According to certain embodiments, the semantic texture map generated by the semantic texture map system may be applied to one or more objects detected within a presentation of an environment displayed at a client device. For example, the semantic texture map may be associated with a set of coordinates that correspond with an object (i.e., a building, a structure, a sculpture). Responsive to detecting a client device at or within a threshold distance of the object (i.e., based on a geo-fence), the semantic texture map system accesses and applies the semantic texture map to a depiction of the object within a presentation of an environment that includes the object at a display of the client device. For example, the texture map may be applied to the object as an overlay, such that the texels of the texture map occupy corresponding positions of a surface of the object, based on the coordinates of the vertices of the 3D model.

By applying the texture map that includes the semantic feature labels to the object in the presentation of the environment at the client device, AR content may be accessed and presented within the presentation of the environment based on the semantic feature labels. As discussed above, the semantic feature labels of the texels of the texture map may provide classification information for a feature of an object presented in the presentation of the environment. For example, a semantic feature label may include an identification of semantic information of the texels, such as which texels are "doors," windows," "walls," "roofs." or "chimney," as well as providing information about material properties of the features represented by the texels, including but not limited to "hardness," "softness." "flexibility," and "gloss."

Doing so enabled the AR content to more realistically interact with the user through the presentation of the space at the client device. As an illustrative example, by labeling which features of a space are "chimneys," AR content may be accessed and presented which interacts with the feature realistically. For example, an AR "Santa Claus" may be accessed and presented within a presentation of a space, responsive to detecting semantic feature labels such as "chimney," and "roof." In some embodiments, other attributes may be taken into account to select the AR content, such as user profile information, temporal information, seasonal information, and location information.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a semantic texture map system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
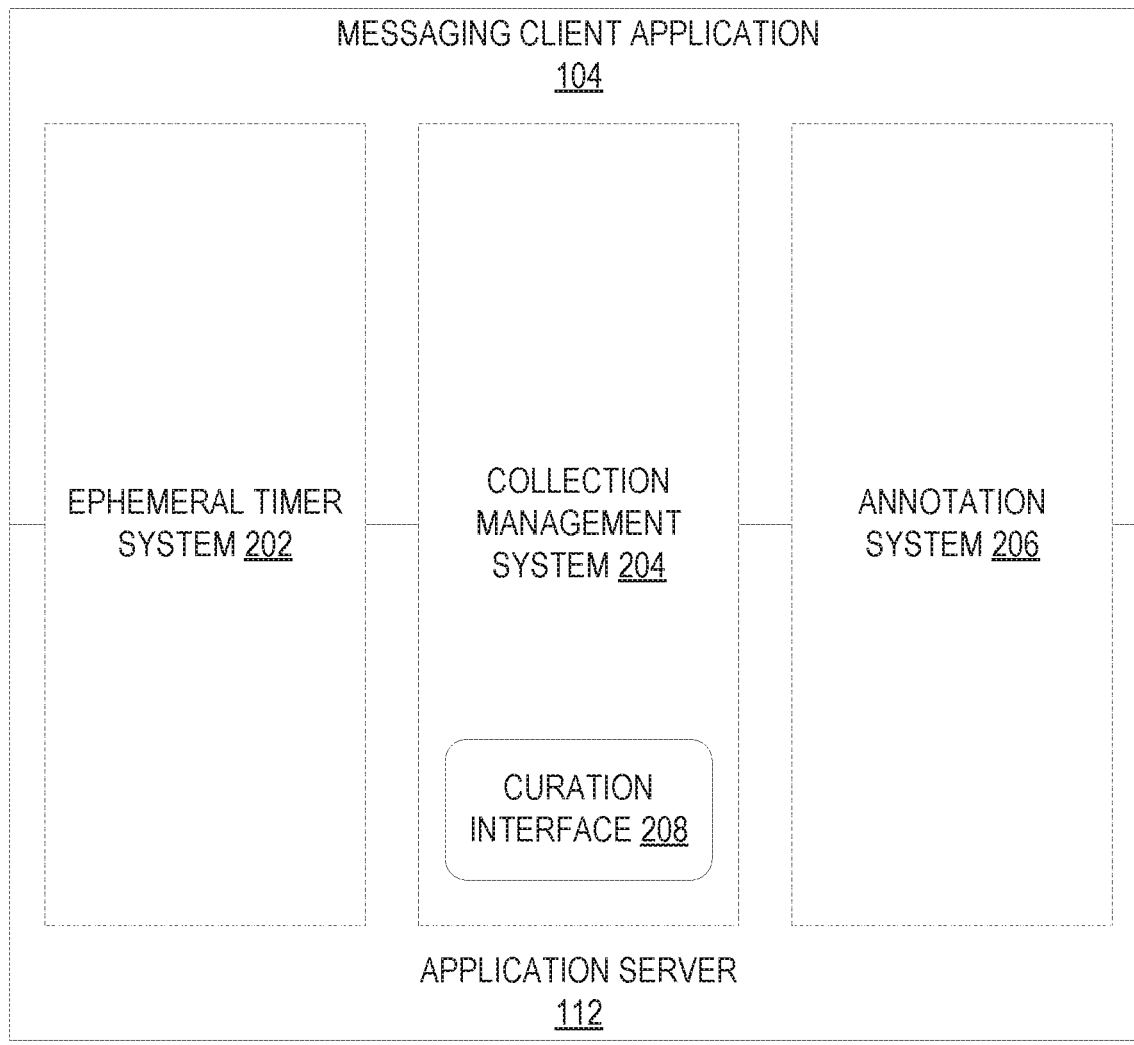
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content, such as user support content received by the user to be forwarded or redistributed to one or more recipients. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
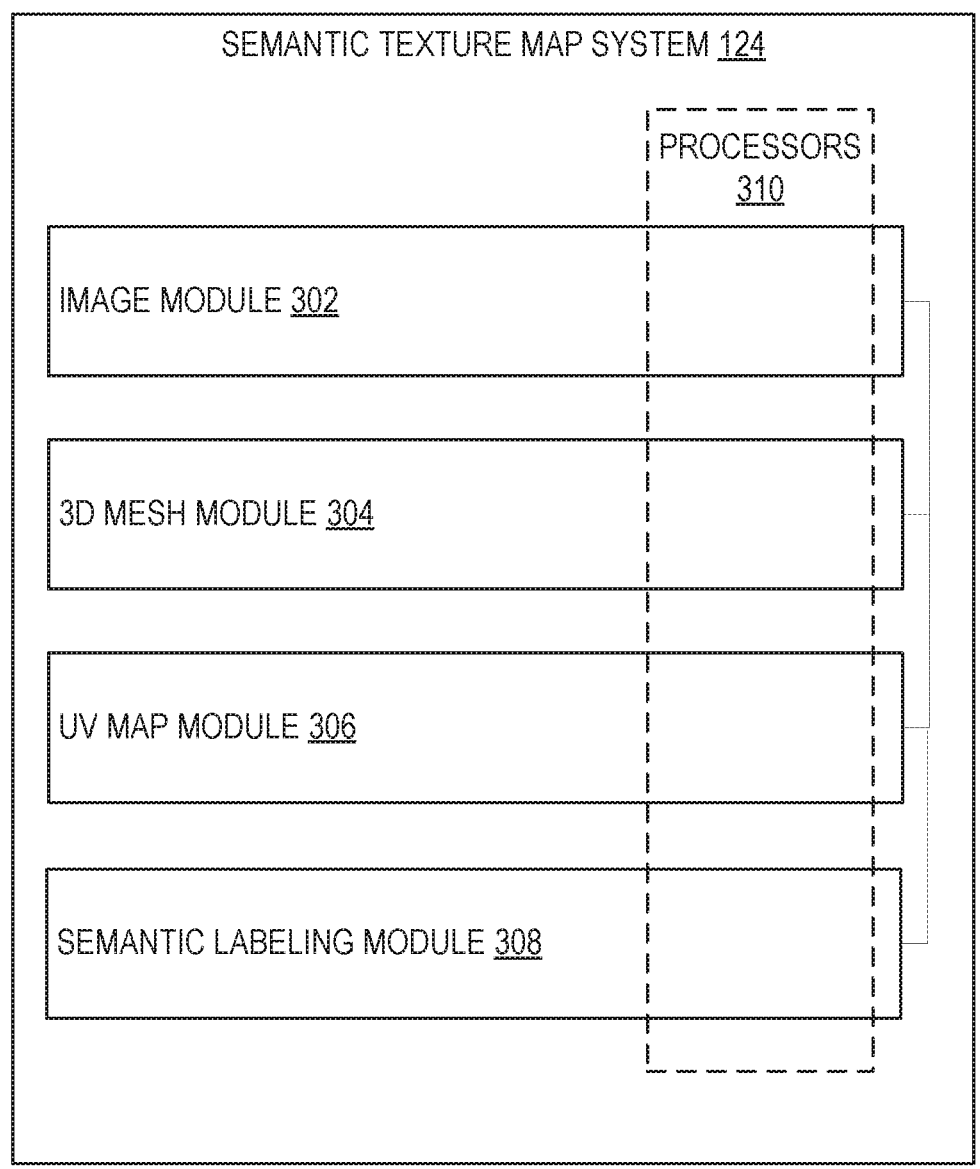
FIG. 3 is a block diagram illustrating various modules of a semantic texture map system, according to certain example embodiments.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the semantic texture map system 124 that configure the semantic texture map system 124 to generate semantic texture maps by performing operations that include: accessing an image that comprises a set of image features; retrieving a semantic segmentation image in response to the accessing the image that comprises the set of image features, where the semantic segmentation image comprises a set of semantic labels; generating a 3D model based on at least the set of image features of the image in response to the accessing the image, wherein the 3D model comprises a plurality of vertices that include coordinates; generating a UV map based on the set of image features and the coordinates of the plurality of vertices of the 3D mesh model, the UV map comprising a set of 2D texture coordinates based on the coordinates of the plurality of vertices; projecting the semantic segmentation image onto the 3D model based on the 2D texture coordinates of the UV map; mapping the set of semantic labels of the semantic segmentation image to the 2D texture coordinates; and generating a texture map that comprises a set of texels based on the semantic labels the UV map, and the 3D mesh model, according to certain example embodiments.

The semantic texture map system 124 is shown as including a image module 302, a 3D mesh module 304, a UV map module 306, and a semantic labeling module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the semantic texture map system 124 may physically include an arrangement of one or more of the processors 310 (e.g., a subset of or among the one or more processors of the machine) configured to perform the operations described herein for that module. As another example, any module of the semantic texture map system 124 may include software, hardware, or both, that configure an arrangement of one or more processors 310 (e.g., among the one or more processors of the machine) to perform the operations described herein for that module. Accordingly, different modules of the semantic texture map system 124 may include and configure different arrangements of such processors 310 or a single arrangement of such processors 310 at different points in time. Moreover, any two or more modules of the semantic texture map system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
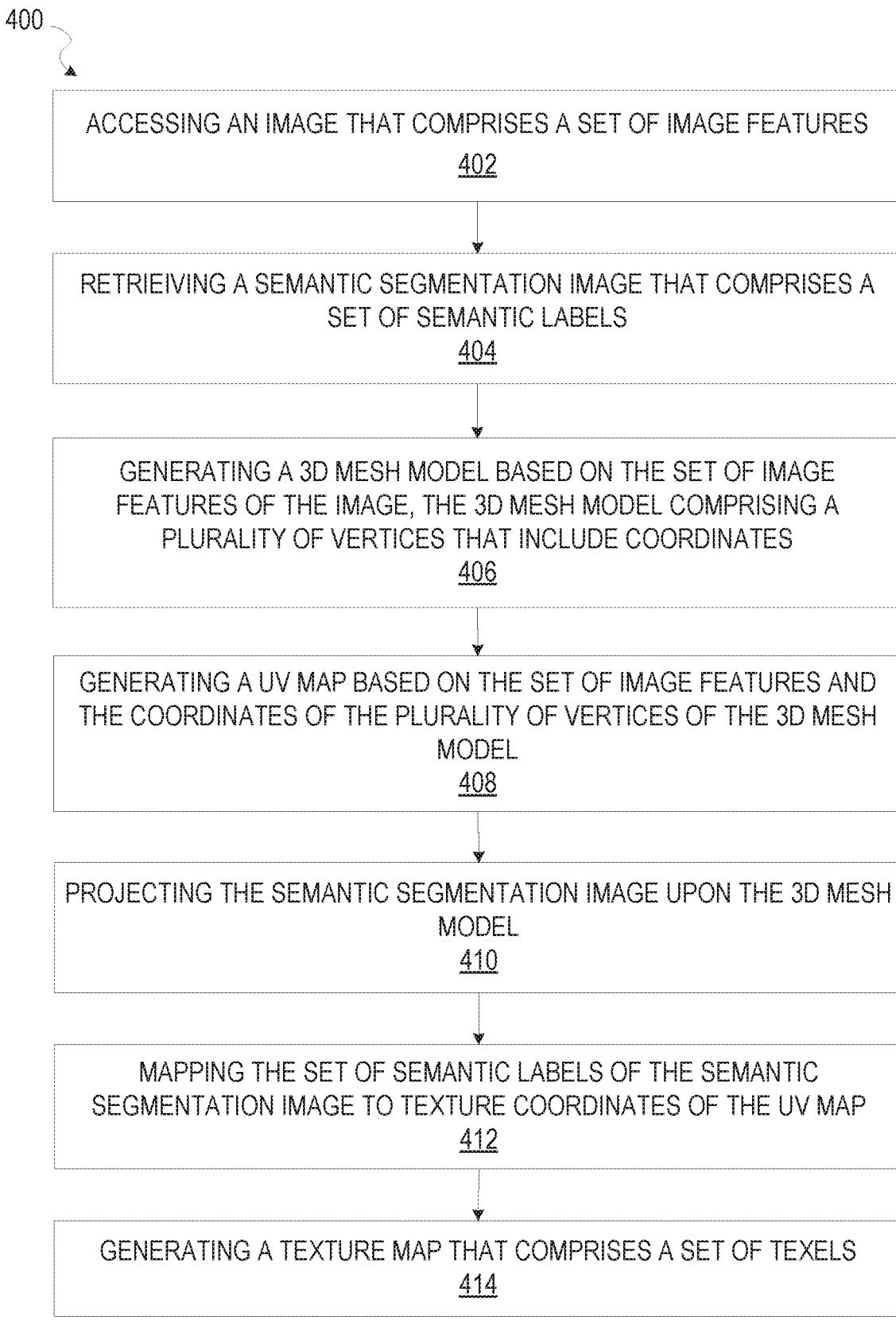
FIG. 4 is a flowchart illustrating a method for generating a texture map that includes semantic labels, according to certain example embodiments.

FIG. 4 is a flowchart illustrating a method 400 for generating a texture map that includes semantic labels, according to certain example embodiments. Operations of the method 400 may be performed by the modules described above with respect to FIG. 3. As shown in FIG. 4, the method 400 includes one or more operations 402, 404, 406, 408, 410, 412, and 414.

At operation 402, the image module 302 accesses an image that comprises a set of image features. For example, the image module 302 may receive the image from a client device 102, wherein the image includes an image presented at a display of the client device 102 and depicts a real-world environment. For example, the client device 102 may include one or more cameras configured to generate and stream image data to be presented at the display of the client device 102, or at an auxiliary device (e.g., streaming video data from the client device 102 to a separate display).

In some embodiments, the image accessed by the image module 302 may include image metadata or other identifying features. For example, the image metadata may identify a location based on geo-location coordinates, or the identifying features may include a barcode or other scannable coded image.

At operation 404, the semantic labeling module 308 retrieves a semantic segmentation image that comprises a set of semantic labels, based on the image features of the image. For example, the semantic labeling module 308 may access a repository, such as the database 120, to retrieve a semantic segmentation image that corresponds with the image, based on the image features or metadata of the image.

In some embodiments, the semantic labeling module 308 generates the semantic segmentation image for a location or object based on a semantic segmentation neural network. For example, the semantic labeling module 308 may access an image repository that comprises collections of images associated with a location or object and use the collections of images to train the semantic segmentation neural network to generate a semantic segmentation image that includes a set of semantic labels.

At operation 406, the 3D mesh module 304 generates a 3D mesh model based on the set of image features of the image, where the 3D mesh model comprises a plurality of vertices that include coordinates. For example, the 3D mesh module 304 may identify an object depicted in the image based on the set of image features of the image metadata, and retrieve a collection of images associated with the object or location, where the collection of images comprises a set of images that depict the object or location depicted by the image accessed by the image module 302. The 3D mesh module 304 process the images through a 3D reconstruction pipeline to obtain a dense 3D mesh representation of the object or location depicted in the image or collection of images, and a 3D pose relative to the object.

At operation 408, the UV map module 306 generates a UV map based on the set of image features of the image and the coordinates of the plurality of vertices of the 3D mesh model. The UV map may therefore comprise a set of 2D texture coordinates that correspond with the coordinates of the vertices of the 3D mesh model. By applying a 2D image to the UV map, the 3D mesh model may be "wrapped" by the 2D image.

A 2D image may be generated based on the image accessed by the image module 302 or based on the collection of images from the database 120. For example, the 2D image may include a photo of an object, or an image generated based on the collection of images that depict the object from the database 120.

At operation 410, the semantic labeling module 308 projects the semantic segmentation image upon the 3D mesh model based on the 2D texture coordinates from the UV map, and at operation 412, maps the set of semantic labels of the semantic segmentation image to the 2D texture coordinates.

At operation 414, the semantic labeling module 308 generates a semantic texture map based on the mapping of the semantic labels to the 2D texture coordinates of the UV map. The texture map comprises a set of texels, wherein each texel includes 2D texture coordinates, and one or more semantic labels. The semantic texture map may therefore comprise a mapping of the semantic labels to the surfaces of the 3D mesh based on the 2D texture coordinates.

In some embodiments, the semantic labeling module 308 may associate the semantic texture map with an object category or location within a database, such as the databases 120. For example, the semantic texture map may be associated with a set of geolocation coordinates that identify a location of interest, or object at a location of interest. As an illustrative example, the semantic texture map may be generated based on a building or structure at a specific location identified by a set of geo-location coordinates, wherein the semantic labels of the semantic texture map assign semantic feature descriptors to one or more elements of the building or structure. For example, a texel of the semantic feature map may indicate that a particular surface of the building or structure is a doorway, or an exit of the building or structure.

FIG. 5 is a flowchart illustrating a method 500 for presenting content based on a semantic feature based on a texture map that include semantic labels, according to certain example embodiments. Operations of the method 500 may be performed by the modules described above with respect to FIG. 3. As shown in FIG. 5, the method 500 includes one or more operations 502, 504, and 506, that may be performed as a part of (e.g., a subroutine) the method 400 depicted in FIG. 4. For example, the method 500 may be performed subsequent to the operations of the method 400.

For example, subsequent to generating the semantic texture map, the semantic texture map system 124 may associate the semantic texture map with a location of interest or object. Responsive to detecting a client device 102 at the location of interest or receiving image data that identifies the object or location of interest, the semantic texture map system 124 retrieves the semantic texture map and applies it to the image data received from the client device 102. The semantic texture map may be overlaid upon an image presented at a display of the client device 102, where a position of the semantic texture map in the image is based on features of the image itself. For example, the semantic texture map may be applied to a building depicted in an image presented at the client device 102, where the semantic labels of the semantic texture map identify and assign properties to one or more features of the building (e.g., doorway, exit, window, roof, chimney, bouncy floor).

At operation 502, the semantic labeling module 308 assigns a material parameter to a feature class that corresponds with a semantic label from among the set of semantic labels included in a semantic texture map. For example, an administrator of the semantic texture map system 124 may assign a material parameter to a class identified by one or more semantic feature labels within the database 120. Material parameters may include graphical properties, such as reflectivity or glossiness, as well as physical properties, such as softness or flexibility. The material parameters may be defined based on a set of interaction variables, wherein a texel assigned a parameter may be interacted with by a user or by AR content based on the associated material parameter.

For example, the material parameter may include a reflectivity value, such that a high reflectivity value may correspond with a mirrored, high reflective surface (i.e., a mirror), while a low reflectivity value would correspond with a non-reflective surface (i.e., a brick wall).

At operation 504, subsequent to assigning the material parameters to the class, the image module 302 detects a texel of a semantic texture map that includes a semantic feature label that corresponds with the class. For example, a user of the client device 102 may display a presentation of a location that includes an object. Responsive to detecting the client device 102 at the location, or detecting the object within the presentation of the location, the semantic texture map system 124 accesses a semantic texture map that corresponds with the location or object, and applies the semantic texture map to one or more relevant surfaces. For example, the semantic texture map may be overlaid upon the object by positioning a 3D mesh model associated with the object at a position based on the position of the object within the presentation of the environment, and then wrapping the 3D mesh model with the texels of the UV map that includes a set of semantic feature labels that include the feature label associated with the class.

At operation 506, AR content may be presented in the presentation of the space based on the material parameter of the texel of the semantic texture map. As an illustrative example, the material parameter may include a high reflectivity value, and the AR content may include a display of an animated graphical avatar at a position within the presentation of the space. Upon detecting the material parameter of the texel, the AR content may be presented accordingly, such that a reflection of the animated graphical avatar may appear in the texel.

Figure 6:
FIG. 6 is a flowchart illustrating a method for applying a semantic texture map to a presentation of an environment at a client device, according to certain example embodiments.
Figure 6:
Figure 6:

FIG. 6 is a flowchart illustrating a method 600 for applying a semantic texture map to a presentation of an environment at a client device 102, according to certain example embodiments. Operations of the method 600 may be performed by the modules described above with respect to FIG. 3. As shown in FIG. 6, the method 600 includes one or more operations 602, 604, and 606, that may be performed as a part of (e.g., a subroutine) the method 400 depicted in FIG. 4. For example, the method 600 may be performed subsequent to generated a semantic texture map based on image data.

At operation 602, the semantic texture map system 124 receives an input assigning the semantic texture map to a location or target object, within a database 120. For example, the semantic texture map may be associated with a set of geolocation coordinates that identify a location, or in further embodiments may be assigned to a set of image features that correspond with a target object.

At operation 604, the semantic texture map system 124 detects a client device 102 at the location identified by the geolocation coordinates associated with the semantic texture map in the database 120. For example, a geo-fence may be configured based on the geolocation coordinates associated with the semantic texture map, where the geo-fence encompasses the location identified by the geolocation coordinates.

At operation 606, responsive to detecting the client device 102 at the location identified by the geolocation coordinates, the semantic texture map system 124 applies the semantic texture map associated with the location to a presentation of an image at the client device 102.

Figure 7:
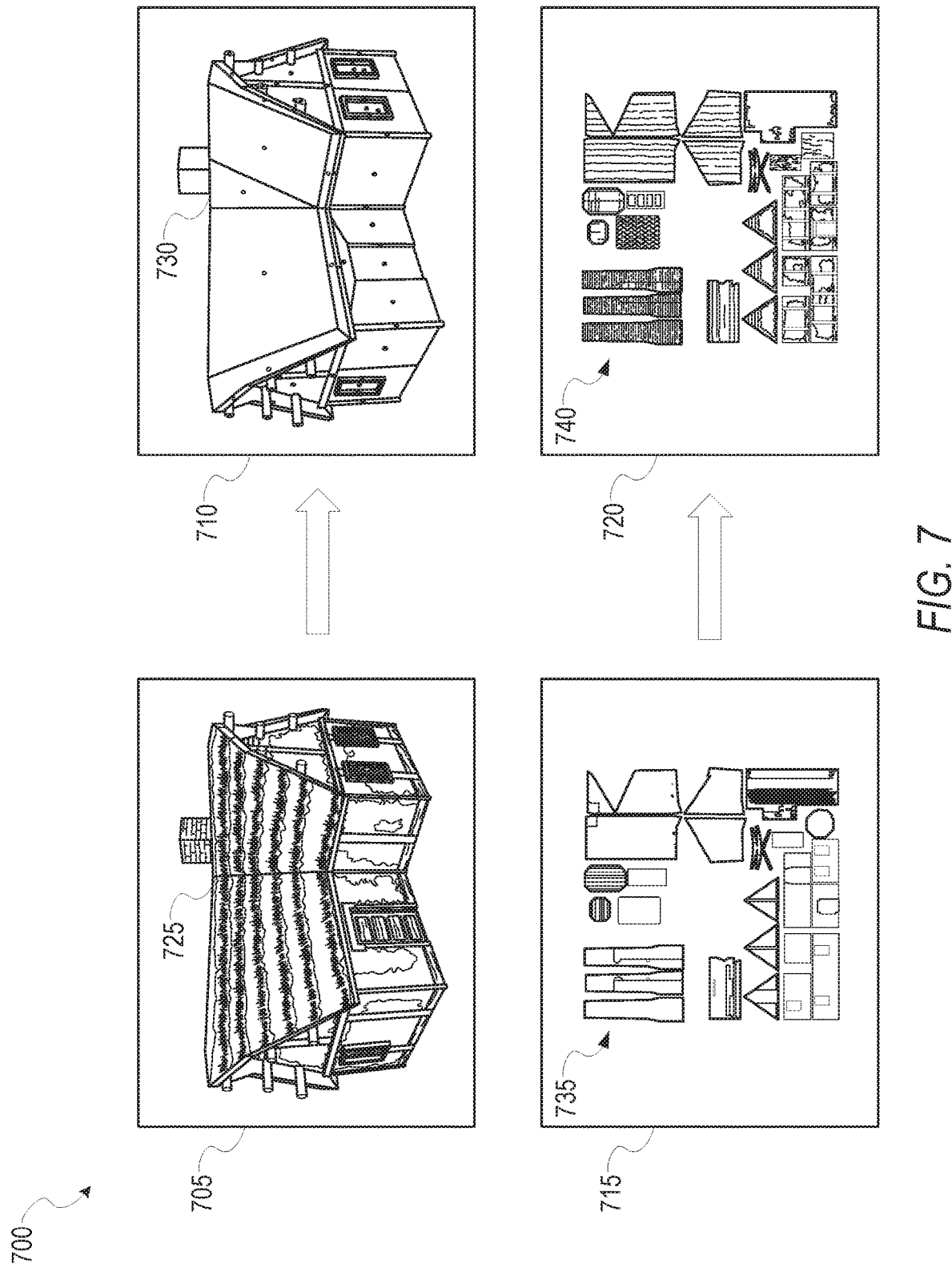
FIG. 7 is a flow diagram illustrating a method for generating a semantic texture map, according to certain example embodiments.

FIG. 7 is a flow diagram 700 illustrating a method for generating a semantic texture map, according to certain example embodiments.

The semantic texture map system 124 generates a semantic texture map based on one or more images that comprise image features. At operation 705 of the flow diagram 700, the semantic texture map system 124 accesses a repository, such as the database 120, wherein the repository comprises a collection of images depicting a target object or location of interest.

As seen in the flow diagram 700, the collection of images may for example include image depicting a target object, such as the house 725. Responsive to accessing the collection of images, at operation 710 the various modules of the semantic texture map system 124 generates a 3D mesh model 730 of a target object depicted in the images, by applying the collection of images to a 3D reconstruction pipeline. The 3D mesh model 730 comprises a set of vertices that include coordinates indicating positions of the vertices relative to one another.

At operation 715, as discussed in operation 408 of the method 400, the semantic texture map system 124 generates a UV map 735 based on the coordinates of the plurality of vertices. The UV map 735 comprises a set of 2D texture coordinates based on the coordinates of the plurality of vertices of the 3D mesh model. As an illustrative example, the UV map 735 may be described as an "unwrapped" layer of the 3D mesh model 730, that defines a set of 2D coordinates which can be used to apply graphics to the 3D mesh model 730.

At operation 720, the semantic texture map system 124 generates a semantic segmentation image 740 based on the collection of images including the image 725, by applying the collection of images to a semantic segmentation neural network. The semantic segmentation image 740 generated by the semantic texture map system 124 provides semantic feature labels to one or more objects depicted in the collection of images. According to certain embodiments, the semantic segmentation image 740 may include semantic feature labels that describe one or more properties of a texel that include texture properties, physical properties, and graphical properties.

As discussed in operation 410 of the method 400, the semantic segmentation image 740 is projected upon the 3D mesh model 725 based on the coordinates from the UV map 735, and the semantic feature labels of the semantic segmentation image 740 are mapped to the coordinates of the UV map 735 in order to generate a semantic texture map.

Figure 8:
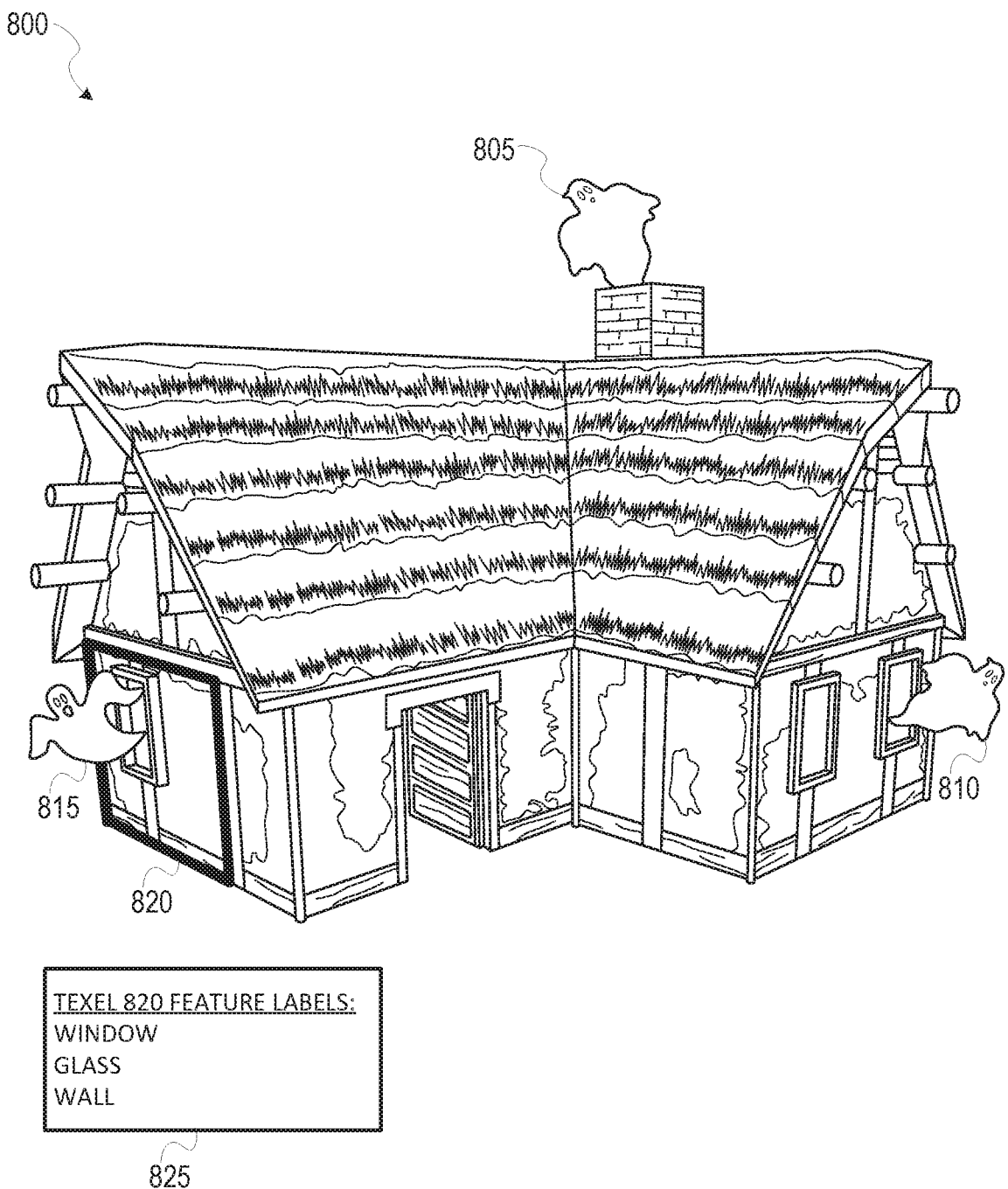
FIG. 8 is an interface diagram depicting augmented reality (AR) content presented based on semantic labels of a semantic texture map, according to certain example embodiments.

FIG. 8 is an interface diagram 800 depicting AR content 805, 810, and 815 presented based on semantic labels, such as the semantic labels from the semantic segmentation image 740 of FIG. 7, according to certain example embodiments.

As seen in the interface diagram 800. AR content 805, 810, and 815 may be presented based on the semantic feature labels of the semantic texture map generated by the semantic texture map system 124. For example, as illustrated in FIG. 8, the AR content 805, 810, and 815 may include graphical elements presented at specific positions in texels displayed an image based on the semantic feature labels of the semantic texture map. For example, the texel 820 (emphasized by bolded lines), may include a set of semantic feature labels 825, where the semantic feature labels identify properties of the texel. As seen in the interface diagram 800, the semantic feature labels 825 of the texel 820 may indicate that the texel includes a window. The semantic feature map system 124 may therefore generate and present the AR content 815 based on one of more of the semantic feature labels 825, providing an added layer of realism to the AR content.

Software Architecture

Figure 9:
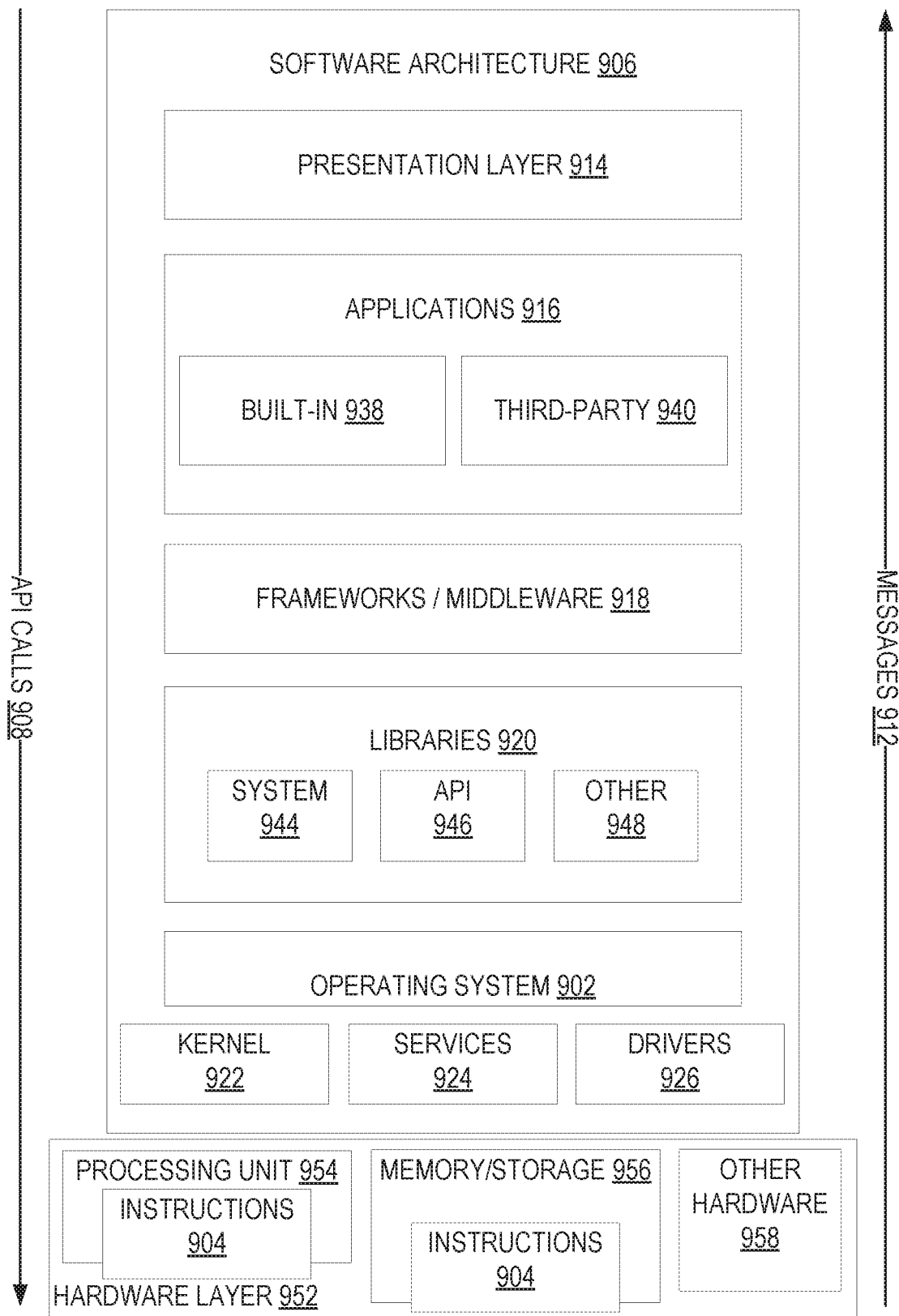
FIG. 9 is a block diagram illustrating a representative software architecture, which may be used in conjunction with various hardware architectures herein described and used to implement various embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as the machine 1000 of FIG. 10 that includes, among other things, processors 1004, memory 1014, and I/O components 1018. A representative hardware layer 952 is illustrated and can represent, for example, the machine 900 of FIG. 9. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 and/or other components within the layers may invoke application programming interface (API) API calls 908 through the software stack and receive a response as in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
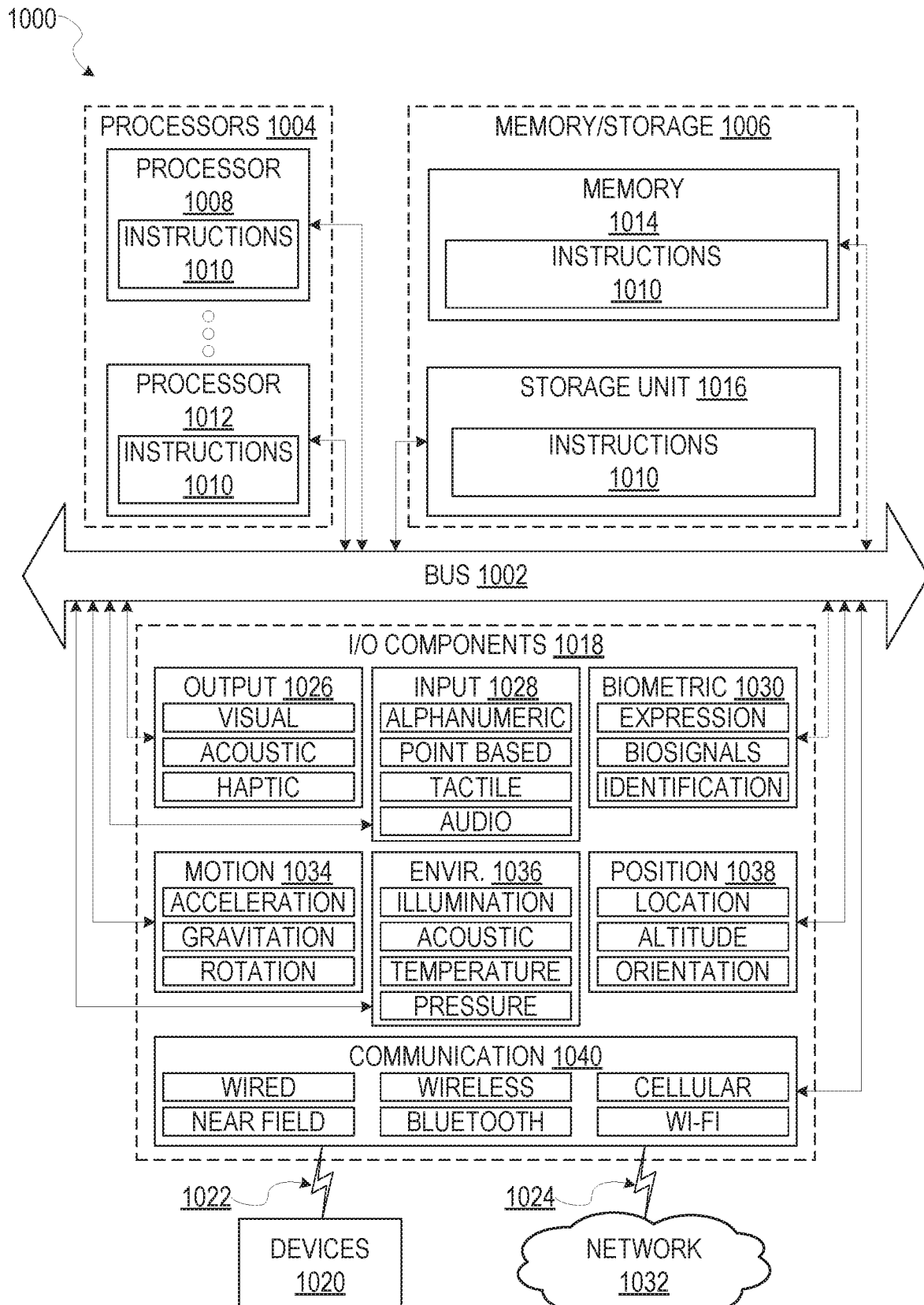
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components. Bluetooth® components (e.g., Bluetooth® Low Energy). Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix. Dataglyph. MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands". "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
accessing an Image that comprises a set of Image features;
retrieving a semantic segmentation Image in response to the accessing the image that comprises the set of Image features, the semantic segmentation Image comprising a set of semantic labels;
generating a three-dimensional (3D) mesh model based on the set of Image features of the image, in response to the accessing the image, the 3D mesh model comprising a plurality of vertices that Include coordinates;
generating a UV map based on the set of Image features and the coordinates of the plurality of vertices of the 3D mesh model, the UV map comprising a set of two-dimensional (2D) texture coordinates based on the coordinates of the plurality of vertices of the 3D mesh model;
projecting the semantic segmentation Image onto the 3D mesh model based on the 2D texture coordinates of the UV map;
mapping the set of semantic labels of the semantic segmentation Image to the 2D texture coordinates of the UV map based on the projecting the semantic segmentation Image onto the 3D mesh model;
generating a texture map that comprises a set of texels based on the semantic labels of the semantic segmentation Image and the UV map;
assigning the texture map a set of geolocation coordinates;
detecting a client device at a location identified by the geolocation coordinates; and
delivering the texture map to the client device;
wherein the set of texels include at least a first texel that comprises a semantic label from among the set of semantic labels, and the method further comprises:
retrieving media content correlated with a class identified by the semantic label; and
applying the media content to the first texel.

2. The method of claim 1, wherein the set of texels include at least a first texel that comprises a semantic label from among the set of semantic labels, and the method further comprises:
receiving an input that assigns a material parameter to a class that corresponds with the semantic label; and
applying the material parameter to the texel.

3. The method of claim 2, wherein the material parameter includes one or more of:
a roughness value;
a metallic value;
a specular value; and
a base color value.

4. The method of claim 1, wherein the detecting the client device at the location identified by the geolocation coordinates includes:
detecting the client device within a geofence that encompasses the location identified by the geolocation coordinates.

5. The method of claim 1, wherein the set of texels include at least a first texel that comprises a semantic label from among the set of semantic labels, and the method further comprises:
receiving a request to assign a material parameter to a class that corresponds with the semantic label from the image; and
causing display of the texel based on the material parameter assigned to the class that corresponds with the semantic label from the image.

6. The method of claim 1, wherein the image comprises a depiction of a target object, and the retrieving the semantic segmentation image in response to the accessing the image that comprises the set of image features includes:
training a semantic segmentation neural network based on a plurality of images that depict the target object and the set of semantic labels.

7. A system comprising:
a memory; and
at least one hardware processor coupled to the memory and comprising Instructions that causes the system to perform operations comprising:
accessing an Image that comprises a set of Image features;
retrieving a semantic segmentation Image in response to the accessing the image that comprises the set of Image features, the semantic segmentation Image comprising a set of semantic labels;
generating a three-dimensional (3D) mesh model based on the set of Image features of the Image, in response to the accessing the Image, the 3D mesh model comprising a plurality of vertices that Include coordinates;
generating a UV map based on the set of Image features and the coordinates of the plurality of vertices of the 3D mesh model, the U V map comprising a set of two-dimensional (2D) texture coordinates based on the coordinates of the plurality of vertices of the 3D mesh model;

projecting the semantic segmentation image onto the 3D mesh model based on the 2D texture coordinates of the UV map;

mapping the set of semantic labels of the semantic segmentation Image to the 2D texture coordinates of the UV map based on the projecting the semantic segmentation Image onto the 3D mesh model;

generating a texture map that comprises a set of texels based on the semantic labels of the semantic segmentation Image and the UV map;

assigning the texture map a set of geolocation coordinates;

detecting a client device at a location identified by the geolocation coordinates; and delivering the texture map to the client device;

wherein the set of texels include at least a first texel that comprises a semantic label from among the set of semantic labels, and the method further comprises:

retrieving media content correlated with a class identified by the semantic label; and applying the media content to the first texel.

8. The system of claim 7, wherein the set of texels include at least a first texel that comprises a semantic label from among the set of semantic labels, and the instructions further comprise:

receiving an input that assigns a material parameter to a class that corresponds with the semantic label; and applying the material parameter to the texel.

9. The system of claim 8, wherein the material parameter includes one or more of:

a roughness value;

a metallic value;

a specular value; and a base color value.

10. The system of claim 7, wherein the detecting the client device at the location identified by the geolocation coordinates includes:

detecting the client device within a geofence that encompasses the location identified by the geolocation coordinates.

11. The system of claim 7, wherein the set of texels include at least a first texel that comprises a semantic label from among the set of semantic labels, and the instructions further comprise:

receiving a request to assign a material parameter to a class that corresponds with the semantic label from the image; and causing display of the texel based on the material parameter assigned to the class that corresponds with the semantic label from the image.

12. The system of claim 7, wherein the image comprises a depiction of a target object, and the retrieving the semantic segmentation image in response to the accessing the image that comprises the set of image features includes:

training a semantic segmentation neural network based on a plurality of images that depict the target object and the set of semantic labels.

13. A non-transitory machine-readable storage medium comprising Instructions that, when executed by one or more processors of a machine, cause the machine to perform operations comprising:

accessing an Image that comprises a set of Image features;

retrieving a semantic segmentation Image in response to the accessing the image that comprises the set of Image features, the semantic segmentation Image comprising a set of semantic labels;

generating a three-dimensional (3D) mesh model based on the set of Image features of the image, in response to the accessing the image, the 3D mesh model comprising a plurality of vertices that include coordinates;

generating a UV map based on the set of Image features and the coordinates of the plurality of vertices of the 3D mesh model, the UV map comprising a set of two-dimensional (2D) texture coordinates based on the coordinates of the plurality of vertices of the 3D mesh model;

projecting the semantic segmentation Image onto the 3D mesh model based on the 2D texture coordinates of the UV map;

mapping the set of semantic labels of the semantic segmentation Image to the 2D texture coordinates of the UV map based on the projecting the semantic segmentation Image onto the 3D mesh model;

generating a texture map that comprises a set of texels based on the semantic labels of the semantic segmentation Image and the UV map;

assigning the texture map a set of geolocation coordinates;

detecting a client device at a location identified by the geolocation coordinates; and delivering the texture map to the client device;

wherein the set of texels include at least a first texel that comprises a semantic label from among the set of semantic labels, and the method further comprises:

retrieving media content correlated with a class identified by the semantic label; and applying the media content to the first texel.

14. The non-transitory machine-readable storage medium of claim 13, wherein the set of texels include at least a first texel that comprises a semantic label from among the set of semantic labels, and the instructions further comprise:

receiving an input that assigns a material parameter to a class that corresponds with the semantic label; and applying the material parameter to the texel.

15. The non-transitory machine-readable storage medium of claim 14, wherein the material parameter includes one or more of:

a roughness value;

a metallic value:

a specular value; and a base color value.

16. The non-transitory machine-readable storage medium of claim 13, wherein the detecting the client device at the location identified by the geolocation coordinates includes:

detecting the client device within a geofence that encompasses the location identified by the geolocation coordinates.

17. The non-transitory machine-readable storage medium of claim 13, wherein the set of texels include at least a first texel that comprises a semantic label from among the set of semantic labels, and the instructions further comprise:

receiving a request to assign a material parameter to a class that corresponds with the semantic label from the image; and causing display of the texel based on the material parameter assigned to the class that corresponds with the semantic label from the image.

18. The non-transitory machine-readable storage medium of claim 13, wherein the image comprises a depiction of a target object, and the retrieving the semantic segmentation image in response to the accessing the image that comprises the set of image features includes:

training a semantic segmentation neural network based on a plurality of images that depict the target object and the set of semantic labels.

\* \* \* \* \*